(12) United States Patent
Bender et al.

(10) Patent No.: US 11,416,140 B2
(45) Date of Patent: Aug. 16, 2022

(54) TOUCHSCREEN DEVICES TO TRANSMIT INPUT SELECTIVELY

(71) Applicant: Hewlett-Packard Development Company, L.P., Spring, TX (US)

(72) Inventors: Roberto Bender, Porto Alegre (BR); Melina Fonseca Silva Jaeger, Porto Alegre (BR); Arthur Ribacki, Porto Alegre (BR); Joao Carrion, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,463

(22) PCT Filed: Jan. 18, 2018

(86) PCT No.: PCT/US2018/014204
§ 371 (c)(1),
(2) Date: Mar. 25, 2020

(87) PCT Pub. No.: WO2019/143335
PCT Pub. Date: Jul. 25, 2019

(65) Prior Publication Data
US 2021/0011622 A1 Jan. 14, 2021

(51) Int. Cl.
*G06F 3/0482* (2013.01)
*G06F 3/0488* (2022.01)
*G06F 3/04886* (2022.01)

(52) U.S. Cl.
CPC ........ *G06F 3/04886* (2013.01); *G06F 3/0482* (2013.01)

(58) Field of Classification Search
CPC ........................... G06F 3/0482; G06F 3/04886
See application file for complete search history.

(56) References Cited

U.S. PATENT DOCUMENTS

| 5,390,295 | A | * | 2/1995 | Bates | G06F 3/0481 714/E11.188 |
|---|---|---|---|---|---|
| 8,552,999 | B2 | | 10/2013 | Dale et al. | |
| 8,717,305 | B2 | | 5/2014 | Williamson et al. | |
| 9,405,400 | B1 | | 8/2016 | Khafizov et al. | |
| 2005/0017957 | A1 | * | 1/2005 | Yi | G06F 3/04886 345/173 |
| 2007/0152976 | A1 | * | 7/2007 | Townsend | G06F 3/016 345/173 |
| 2012/0105481 | A1 | | 5/2012 | Baek et al. | |

(Continued)

OTHER PUBLICATIONS

Touch Behaviour, https://msdn.microsoft.com/en-us/library/dn915123(v=vs.85).aspx.

*Primary Examiner* — Hong Zhou
(74) *Attorney, Agent, or Firm* — Perry + Currier Inc.

(57) ABSTRACT

An example of an apparatus including a touchscreen device to receive input and selectively transmit the input. The apparatus further includes a rendering engine to render output to a region of the touchscreen device. The output corresponds to boundaries of the region of the touchscreen device, wherein the touchscreen device uses the boundaries and a location of the input to determine whether to transmit the input. The apparatus also includes a processor to receive the input transmitted from the touchscreen device.

14 Claims, 6 Drawing Sheets

(56) References Cited

U.S. PATENT DOCUMENTS

| | | | |
|---|---|---|---|
| 2013/0234982 A1* | 9/2013 | Kang | G06F 3/0488 |
| | | | 345/174 |
| 2014/0051482 A1* | 2/2014 | Makiguchi | H04M 1/72463 |
| | | | 455/566 |
| 2015/0015506 A1* | 1/2015 | Lares | G06F 3/04886 |
| | | | 345/173 |
| 2015/0362959 A1 | 12/2015 | Popescu | |
| 2017/0075457 A1* | 3/2017 | Hayashi | G06F 3/0442 |
| 2017/0234691 A1 | 8/2017 | Abramson et al. | |
| 2017/0277367 A1 | 9/2017 | Pahud et al. | |
| 2017/0322649 A1 | 11/2017 | Wang et al. | |
| 2019/0138203 A1* | 5/2019 | Yildiz | G06F 3/03545 |

* cited by examiner

TOUCHSCREEN DEVICES TO TRANSMIT INPUT SELECTIVELY

BACKGROUND

Touchscreen devices are common in tablets and smartphones, and a common characteristic those devices is that the touchscreen devices may support a single full screen application.

BRIEF DESCRIPTION OF THE DRAWINGS

Reference will now be made, by way of example only, to the accompanying drawings in which.

DETAILED DESCRIPTION

Computer apparatus and systems typically include means to interact with a user to present output and receive input. For example, touchscreen devices may be used to present information and receive user input associated with the presented information. The use of touchscreen devices may provide a better user experience than receiving the same information through other input devices such as keyboards and/or pointer devices, especially with new users or users who are less familiar with the computer apparatus. There are several manners by which touchscreen devices receive input from various input devices such as a stylus or a finger. For example, the touchscreen device may use resistive or capacitive technologies.

Touchscreen devices have been increasing in popularity for other operating systems and with larger touchscreen devices, where there may be several applications opened in different and customizable windows. Accordingly, the act of touching the touchscreen device may be translated into a mouse event that may be used to change the application in focus, for handwriting, drawing and several other applications. Incidentally, all touches on the touchscreen device are typically translated and they may create odd unexpected behavior.

In some applications, touchscreen devices are used to simulate writing or drawing, such as on a canvas or paper, where the touchscreen device may be used to receive input from more than one source. For example, the touchscreen device may receive input from a stylus, hand, or finger as a user writes or draws on the touchscreen device and manipulates other features of the application or operating system, such as to switch applications or to adjust a window size, a screen brightness, or a volume of the computer apparatus.

Accordingly, the touchscreen device is configured to receive multiple inputs from various sources to provide additional functionality. As an example, the touchscreen device may typically receive input associated with an application within the application window and then receive another input outside the application window to change applications or interact with the operating system. When the touchscreen device receives multiple inputs, the user may also generate accidental input received by the touchscreen device. For example, if the touchscreen device is to operate a virtual keyboard, a user may rest a palm on the touchscreen device outside or near the virtual keyboard edges causing unintended input being to be received by the touchscreen device. As another example, a user who operates a stylus in a drawing application may touch a portion of the touchscreen device proximate to the stylus tip to support a hand when fine features are drawn.

Figure 1:
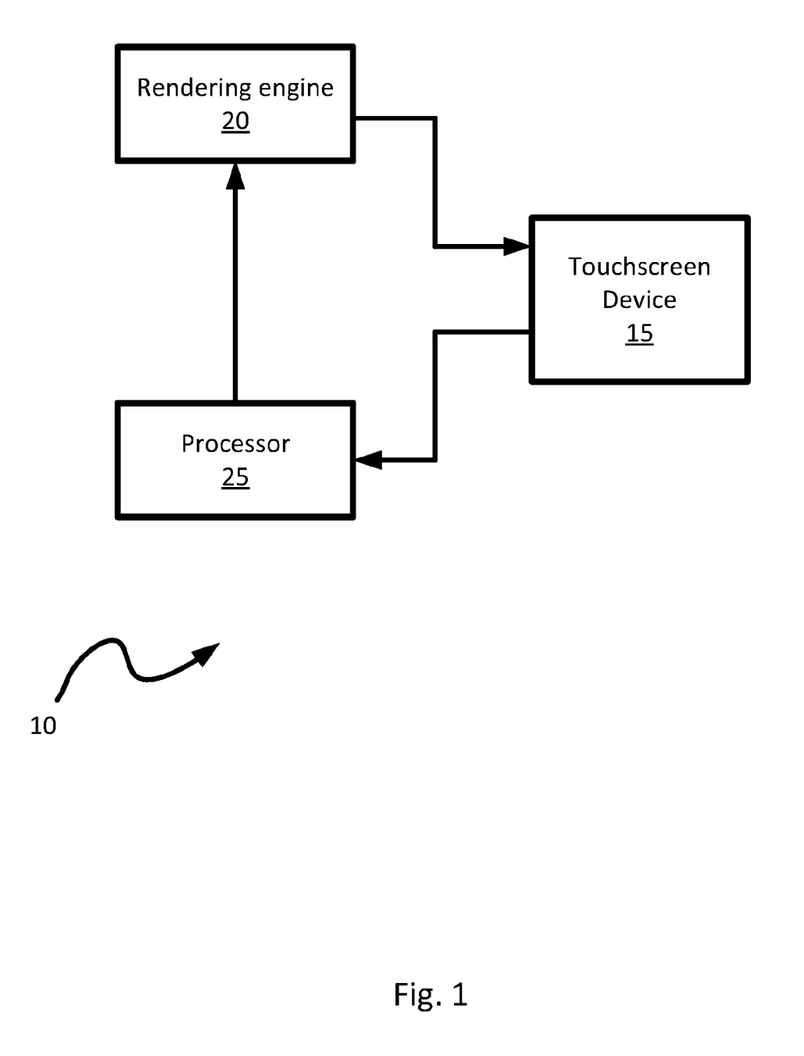
FIG. 1 is a block diagram of an example apparatus.

Referring to FIG. 1, an example apparatus for interacting with a user is generally shown at 10. The apparatus may include additional components, such as various memory storage units, interfaces to communicate with other computer apparatus or devices, and further input and output devices to interact with the user. In the present example, the apparatus includes a touchscreen device 15, a rendering engine 20, and a processor 25. Although the present example shows the rendering engine 20 and the processor 25 as separate components, in other examples, the rendering engine 20 and the processor 25 may be part of the same physical component such as a microprocessor configured to carry out multiple functions.

The touchscreen device 15 is to receive input and to selectively transmit the input to the processor 25. The touchscreen device may also include a light emitter such as an array of light emitting diodes (LED), liquid crystals, plasma cells, or organic light emitting diodes (OLED). Alternatively, the display may also include non-emitting screens such as an electrophoretic ink (E-ink) screen. Furthermore, it is to be understood that the touchscreen device 15 includes a mechanism to receive touch events on a surface using sensors such as a capacitive or resistive sensor array (not shown). The events measured on the surface of the touchscreen device 15 may be converted into input for transmission to the processor 25 for further action. In this example of the touchscreen device 15, only a portion or subset of the events received on the surface may be converted and transmitted to the processor. The manner by which the touchscreen device 15 selects and/or determines which events to convert to input for transmission is not limited. For example, it may involve a determination of the location of the event in relation to a predetermined region.

It is to be understood that the touchscreen device 15 is also generally configured to generate output received from the rendering engine 20 or any other source of rendered data. For example, the touchscreen device 15 may be configured to output information related to content that is provided by an application during execution of the application by the operating system of the apparatus 10 and to receive input to control the application. The input received at the touchscreen device 15 is not limited and may include input that may have otherwise been received via the other input devices, such as a pointing device, a touchpad, or a keyboard.

In the present example, the touchscreen device 15 may be configured to provide input to a drawing application while still able to receive further input to navigate through various menus associated with the application or receive further input to switch or control other applications or the operating system of the apparatus 10. In some examples, the touchscreen device 15 may contain an internal processor, memory and data communications interface. In other examples, the touchscreen device 15 may be controlled with a separate controller or by other components of the apparatus 10.

The manner by which the touchscreen device 15 determines whether input is to be transmitted to the processor 25 is not limited and may include consideration of various factors discussed in greater detail below. For example, the touchscreen device 15 may use a predefined region to determine whether to transmit input received at a location within the region selectively.

The rendering engine 20 is to render output to a region or portion of the touchscreen device 15, such as a predefined region. The rendered output may correspond to content with which a user interacts. In addition, the rendered output may provide a visual aid to facilitate the identification of the boundaries. The exact nature of the rendered output is not particularly limited and may include the entirety of the touchscreen device 15 or a small portion of the touchscreen device 15. In the present example, the rendered output may be used determine the region. For example, application windows or other features rendered on the touchscreen device 15 may be used to define the region. As another example, the rendered output may correspond to a boundary of a region of the touchscreen device 15. In another example, the rendered output may include a border or an application window rendered around a region of the touchscreen device 15 in some examples. In other examples, the rendered output may highlight the content in the region, such as with an increase to the brightness within the region, zoom the region, or apply a filter or tint to the region. Alternatively, other areas outside of the region may be faded, blacked out or have the color palette modified. In the present example, the rendering engine 20 provides the rendered output to the touchscreen device 15 via a communication interface and/or link.

It is to be appreciated that the rendered output may or may not include visual aids to be outputted by the touchscreen device 15. For example, the touchscreen device 15 may be configured to output the rendered output to facilitate the user of the apparatus when drawing. However, in some instances, a user may find the visual aids to be distraction such that an option to toggle the visual aids off may be provided. Accordingly, a setting may be provided at the touchscreen device 15 to determine whether to deactivate or to reactivate the visual aids.

It is to be appreciated that the rendering engine 20 is not limited to render output to only a region of the touchscreen device 15. For example, the rendering engine 20 may be configured to render other output of the touchscreen device. For example, the rendering engine 20 may be configured to generate and/or render images from raw data stored in a memory storage unit or data received from the application representing output in response to an input received at the touchscreen device 15. The rendering engine 20 may provide still images, video and the like for display. In some examples, the rendering engine 20 may be limited to render output to the region and output for other regions or portions is carried out by a separate component.

The processor 25 is to receive input transmitted from the touchscreen device 15. The processor may include a central processing unit (CPU), a microcontroller, a microprocessor, a processing core, a field-programmable gate array (FPGA), an application-specific integrated circuit (ASIC), or similar. The processor 25 may cooperate with a memory storage unit to execute various instructions. In this example, the processor 25 may maintain and operate various applications with which the user may interact. In other examples, the processor may send or receive data, such as input and output for the touchscreen device 15 over a network to an external server or remote device.

Figure 2:
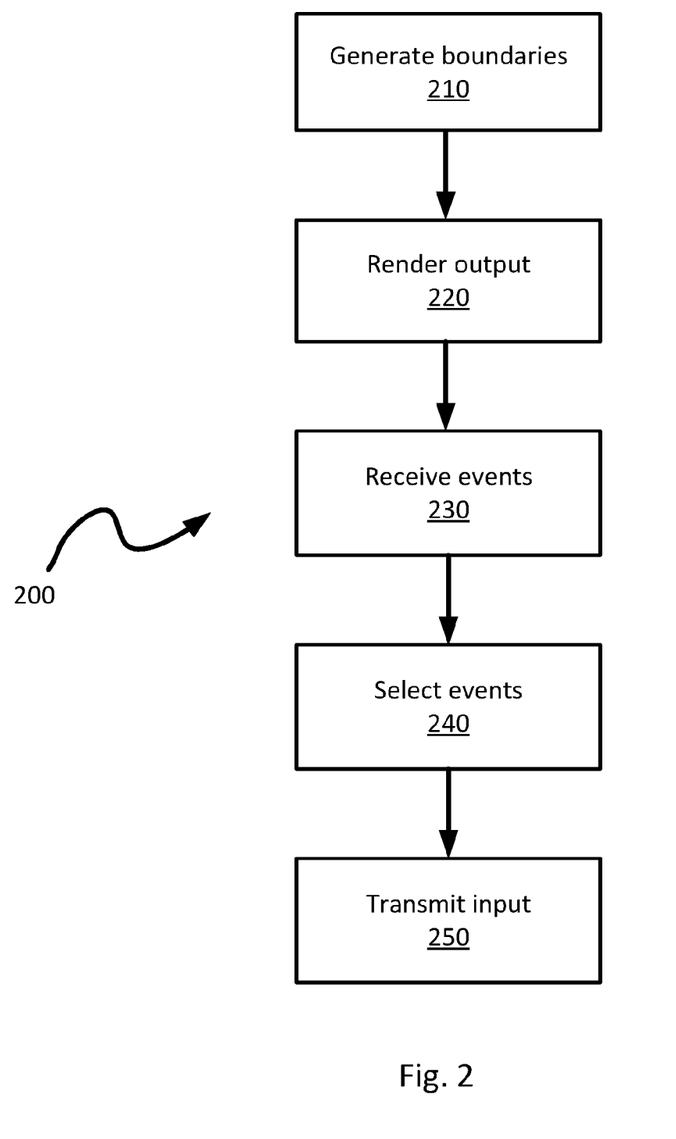
FIG. 2 is a flowchart of an example of a method.

Referring to FIG. 2, a flowchart of an example method to interact with a user via a touchscreen device 15 is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the touchscreen device 15, and apparatus 10 and its various components. In addition, it is to be emphasized, that method 200 need not be performed in the exact sequence as shown, and various blocks may be performed in parallel rather than in sequence, or in a different sequence altogether.

Beginning at block 210, the processor 25 generates boundaries to define a region of the touchscreen device 15. The manner by which the region and boundaries are determined is not particularly limited. The region may be defined prior to the generation of the boundaries such that the boundaries are generated to surround the region. In the present example, the region of the touchscreen device 15 may correspond to a window of an application that is executed on the operating system of the apparatus 10. In this example, the boundary may be defined as the border of the window of the application. In examples where more than one application is running, the region may be defined as the application window that is presently in use and in focus of the operating system (e.g. the application in the foreground).

In other examples, the region of the touchscreen device 15 may correspond to a region where unintended input is anticipated. The manner by which the region where unintended input is anticipated is not limited. For example, the region may be defined based on a predetermined factor. For example, the region may be defined relative to a window of an application such that the region includes the window and extends beyond by a fixed or relative amount of distance to avoid unintended input close to the window on the touchscreen device 15. In other examples, the region may be unrelated to the window of an application and instead be relative to an input or last known input, such as from a stylus and be defined as the region within a certain radius from the last known stylus input. In further examples, the region may be skewed relative to the stylus input to accommodate for the left or right handedness of the user where the unintended input may arise from palm or wrist contact.

In additional examples, the region may be user defined or determined by the processor 25 based on a known user or via a menu selection option. For example, the apparatus 10 may store a plurality of user profiles with unique regions, and retrieve the appropriate user profile after identification of the user of the apparatus 10. In other examples, the region may also be determined with various machine learning techniques to identify areas of the touchscreen device 15 where unintended input is received. In addition, some examples may include a camera or other sensor to detect and identify unintentional touch events. In other examples, the region may be considered to be the entire touchscreen device 15 such that input events are included for the following blocks.

Block 220 uses the rendering engine 20 to render output to the touchscreen device 15 that corresponds with the boundaries generated at block 210. The output rendered may correspond to a visual indicator for identification of the region associated with the boundaries generated at block 210. Accordingly, the rendered output may be used determine boundaries the region. For example, the rendered output may include a border, such as a solid or dashed line along the boundary of the region. As another example, the rendered output may include adjustments of the brightness of the region or application of a filter or tint to the region. In some examples, the type of rendered output provided by the rendering engine 20 may be user selectable or associated with a user profile and dependent on user preferences. Generation of output at the touchscreen device 15 may provide the user with an indication of an expected response to a touch event.

It is to be appreciated that the rendered output displayed by the touchscreen device 15 may provide a visual indicator of the region where input received by the touchscreen device 15 may be treated differently than other areas of the touchscreen device 15. In particular, the rendered output typically identifies the region where input may be filtered to reduce the transmission of unintended input from the touchscreen device 15. In some examples, the user may temporarily disable the visual indicators on the touchscreen device 15 to avoid distractions.

Block 230 involves a plurality of events received by the touchscreen device 15 within the region bounded by the boundaries generated at block 210. It is to be appreciated that the events correspond in input received by the touchscreen device 15. In the present example, the touchscreen device 15 is configured to receive multiple inputs from multiple sources. In particular, the touchscreen device 15 may be configured to receive input from a pointing device, such as a stylus or pen as well as input from a finger or hand.

Block 240 selects a portion of the events received at block 230 for conversion and transmission from the touchscreen device 15 to the processor 25. The manner by which the input is divided into portions and the determination of which portions to transmit is not particularly limited. For example, the touchscreen device 15 may classify events into different types of events. The manner by which the events are classified is not limited and may involve a determination of the location of an event in relation to the boundaries of the region generated in block 210. Once classified, the touchscreen device 15 may convert a first type event to input for transmission to the processor 25 and may reject a second type event to effectively ignore the second type event.

In the present example, a first type event may include events on the surface of the touchscreen device 15 within the predefined region. A second type event may be an event detected outside of the region defined in block 210. In the present example, it is assumed that events detected within the region are intentional and that other events outside the region are unintentional.

In another example, the event types may be classified by another characteristic of the event. For example, a first type event may include events on the surface of the touchscreen device 15 associated with a stylus or any other suitable pointing device in contact or proximate to the touchscreen device 15. A second type event may include other events on the touchscreen device 15, such as a finger touch with the touchscreen device 15 within the boundaries defined in block 210. In this example, it is assumed that the stylus input is intentional and that other input such as a finger or palm near the stylus is unintentional.

In another example, a first type event may include events on the touchscreen device 15 that have a contact area of below a threshold size. In this example, a second type event may include events on the touchscreen device 15 that have a contact area of above a predetermined threshold size. Accordingly, it is assumed that the fine input where the point of contact is small, such as with a fingertip or stylus, is intentional and that other input over a broad area is unintentional since it is likely a body part or other object that makes accidental contact with the touchscreen device 15. Other examples may also use the shape of an input event on the touchscreen device 15 in combination with or separated from the size to classify the event type.

It is to be appreciated that although this example includes two event types, events on the surface of the touchscreen device 15 may be classified into more event types. Accordingly, the event types that are transmitted to the processor 25 from the touchscreen device 15 may include more than one type. Additionally, where more event types are used, different applications may call for different types of events to be converted to input for transmission.

The mechanism by which the selection is made is not limited and may involve a hardware mechanism or software mechanism. For example, where event types are detected with different sensor arrays (e.g. capacitive vs. resistive), one of the sensor arrays may be deactivated. In other examples, such as selections made in association with the size of the point of contact, a software rejection method may be used in the touchscreen device 15.

Furthermore, although the above method classifies the input events into event types, other classification methods are contemplated. For example, input events may be classified by the action to be taken by the processor 25. For example, the input event may be classified as a selection of an application window, a selection of a shortcut option, or an input associated with application input, such as input that represents a line being drawn or input that represents a change of an image feature within the application, such as color or size.

Next, block 250 transmits the portion of the input selected in block 240 from the touchscreen device 15 to the processor 25. Since only a portion of the input is transmitted to the processor 25, fewer events are processed by the processor 25 than if more events from the touchscreen device 15 were to be transmitted.

The application of the method 200 to a touchscreen device 15 may result in the improved performance of the touchscreen device 15 with the reduction in the number of unintended input events and decrease the amount of data transferred from the touchscreen device 15 to the processor 25. Furthermore, the method 200 reduces the amount of input data required by the processor 25 if other palm rejection algorithms were to be applied to more input events received at the touchscreen device 15. The method 200 may be carried out once each time an application is started or brought in focus on the apparatus 10 in examples where the region is defined. In other examples where the region is based on the position of the stylus or a contact size, the method 200 may be continuously performed whenever a stylus or sufficiently small contact size is detected within range of the touchscreen device 15.

Figure 3:
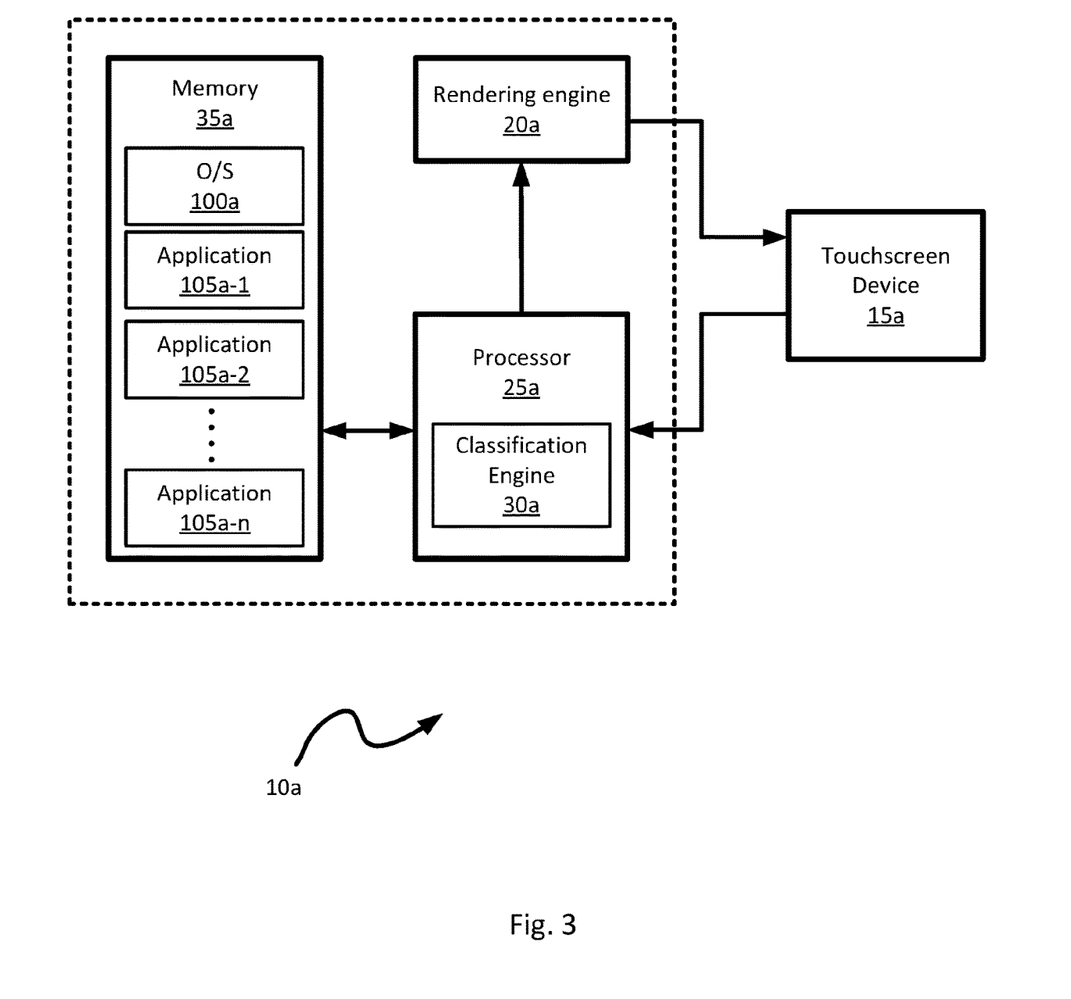
FIG. 3 is a block diagram of another example apparatus.

Referring to FIG. 3, another example of an apparatus to interact with a user is shown at 10a. Like components of the apparatus 10a bear like reference to their counterparts in the apparatus 10, except followed by the suffix "a". The apparatus 10a includes a touchscreen device 15a, a rendering engine 20a, a processor 25a, and a memory storage unit 35a. Although the present example shows the rendering engine 20a and the processor 25a as separate components, in other examples, the rendering engine 20a and the processor 25a may be part of the same physical component such as a microprocessor capable to carry out multiple functions.

The touchscreen device 15a is to receive input and to transmit the input to the processor 25a. In the present example, the touchscreen device 15a is similar to the touchscreen device 15. However, the touchscreen device 15a does not perform any classification prior to transmission of the input data to the processor 25a. Instead, the touchscreen device 15a sends input events to the processor 25a to process subsequently as discussed in greater detail below.

In the present example, the processor 25a includes a classification engine 30a. In this example, the classification engine 30a operates at the system driver level to receive raw input from the touchscreen device 15a. In particular, the classification engine 30a receives the input data prior to translation into usable data by an application. Accordingly, the classification engine 30a may be used to carry out the method 200 to determine a portion of the input data that is to be translated and provided to the processor 25a for additional actions, such as for other applications executed on the apparatus 10a.

The memory storage unit 35a is coupled to the processor 25a and may include a non-transitory machine-readable storage medium that may be any electronic, magnetic, optical, or other physical storage device. In the present example, the memory storage unit 35a may store an operating system 100a that is executable by the processor 25a to provide general functionality to the apparatus 10a, for example, functionality to support various applications 105a. Examples of operating systems include Windows™, macOS™, (OS™, Android™, Linux™, and Unix™. The memory storage unit 35a may additionally store instructions to operate the classification engine 30a at the driver level as well as other hardware drivers to communicate with other components and optional peripheral devices of the apparatus 10a.

Furthermore, the memory storage unit 35a may also store executable instructions for a plurality of applications 105a-1, 105a-2, . . . , 105a-n (generically, these applications are referred to herein as "application 105a" and collectively they are referred to as "applications 105a", this nomenclature is used elsewhere in this description).

It is to be appreciate that although the present example transmits the raw data from the touchscreen device 15a to the classification engine 30a of the processor 25a, the apparatus 10a still provides improved efficiencies over the other palm rejection techniques. In particular, since the classification engine 30a operates at the driver level, less raw data received at the processor 25a is translated for use by the applications 105a.

Figure 4:
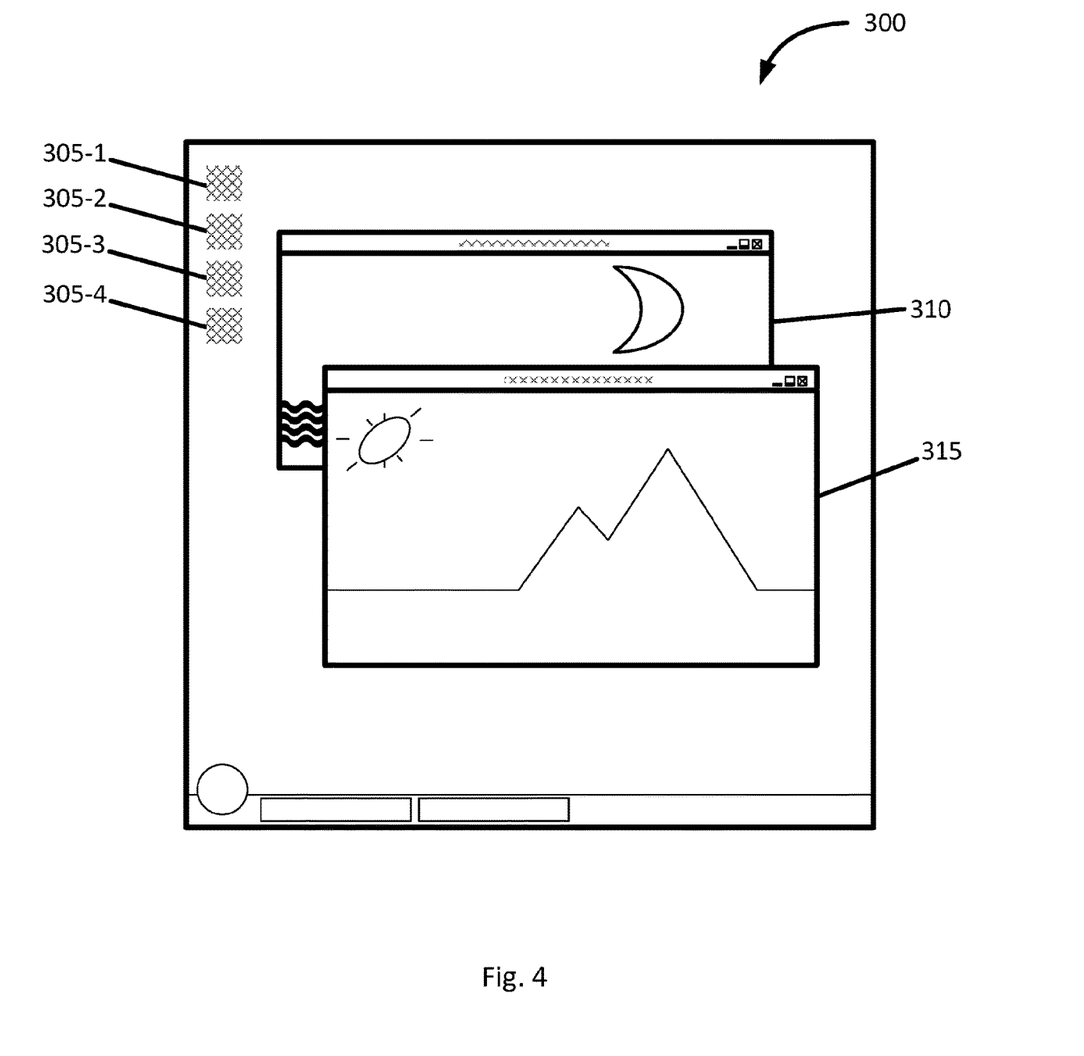
FIG. 4 is an example of a sample page.

FIG. 4 shows an example of a sample screenshot 300 of the touchscreen device 15a in accordance with an example where two applications 105a are executed by the apparatus 10a. The sample screen shot includes a plurality of shortcut icons 305-1, 305-2, 305-3, and 305-4, a first application window 310, and a second application window 315. In order to further understand the apparatus 10 and 10a as well as the method 200, it is assumed that the method 200 may be applied to the screenshot 300.

In this example, the application window 315 operates a drawing application 105a and is in use and in focus. In particular, the application window 315 may represent a drawing application 105a-1 where a user may draw pictures with a specialized stylus. The application window 310 illustrates another drawing application 105a-2 where a user also draws with a stylus. However, as shown in FIG. 4, the application 105a-2 is out of focus of the operating system.

Referring back to the method 200, the boundaries generated at block 210 may be the borders of the application window 315. Accordingly, the rendering engine 20a may render output to the touchscreen device 15a to indicate the boundaries of the region. In this example, since the boundaries of the region coincide with the borders of the application window 315, the rendered output may not be visible and is not necessarily shown in the screenshot 300.

Continuing with this present example, a plurality of events may be received within the region as well as outside of the region. As the method 200 is not applied to outside input (i.e. input received on the touchscreen device outside of the region defined in the block 210), outside input received by the touchscreen device 15 is automatically transmitted to the processor 25a for further processing. Accordingly, the apparatus 10a allows a user to provide input on the touchscreen device 15a outside of the application window 315 with any means available, such as a stylus, a finger, a palm, or other object. For example, the user may select a shortcut icon 305 with a finger while a stylus is used to draw additional shapes within the window 315. Similarly, the user may use a finger or stylus to bring the window 310 into focus simply with a touch input in a region within the application window 310 that is not overlapped by the application window 315.

Within the application window 315, the plurality of events that are received are classified into different event types. In the present example of a drawing application with a stylus, input from the stylus is transmitted from the touchscreen device 15a to the processor 25a, but input from a portion of a hand of a user within the application window 315 is to be rejected. Accordingly, this feature allows a user to rest portions of a hand, such as a finger or palm, within the application window 315 to support fine movements of the stylus without disruptions caused by unintentional input events during the drawing process.

Figure 5:
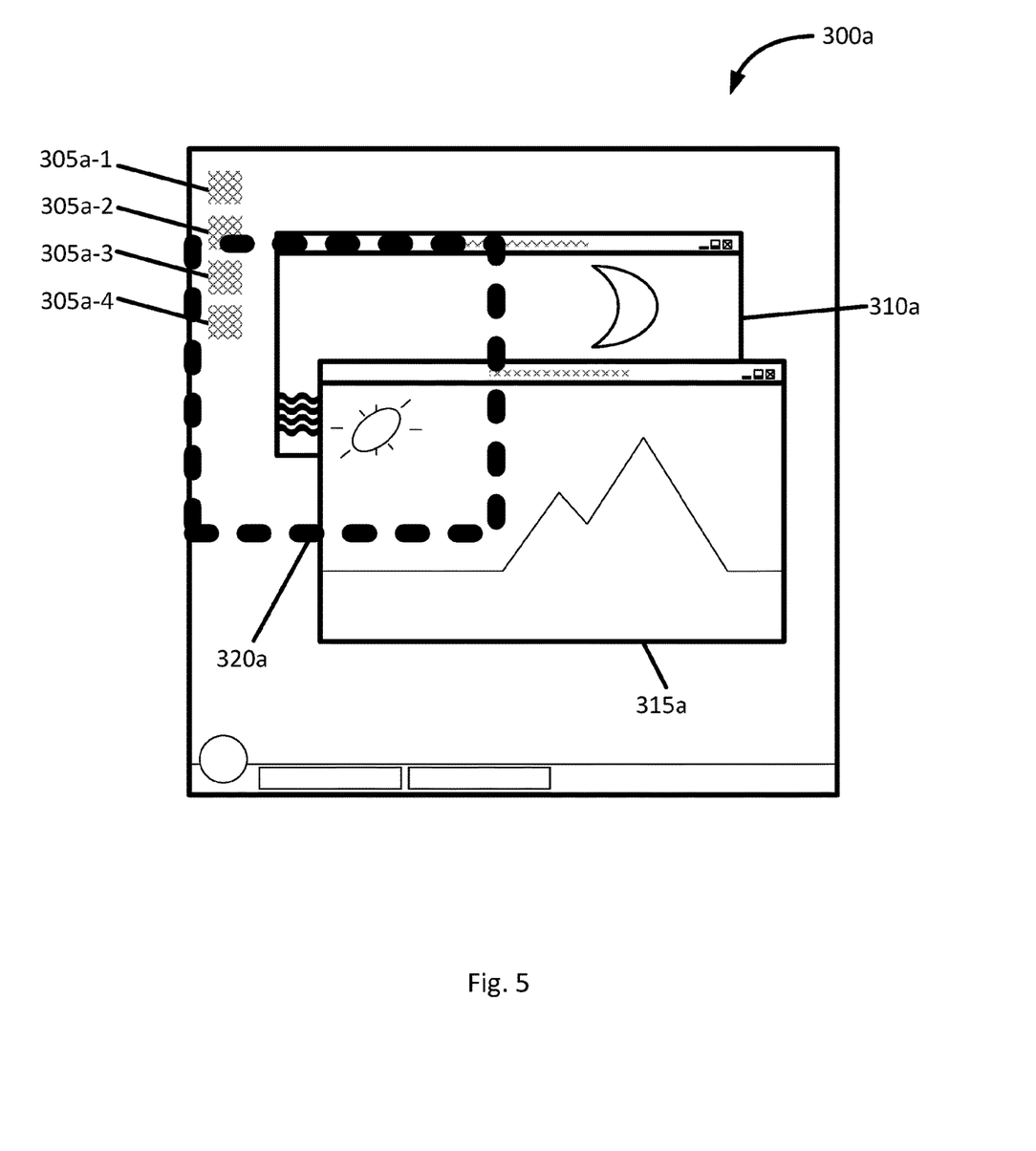
FIG. 5 is an example of another sample page.

FIG. 5 shows another example of a sample screenshot 300a of the touchscreen device 15a in accordance with an example with two applications 105a executed on the apparatus 10a. The sample screen shot includes a plurality of shortcut icons 305a-1, 305a-2, 305a-3, and 305a-4, a first application window 310a, and a second application window 315a. In order to further understand the apparatus 10 and 10a as well as the method 200, it is assumed that the method 200 may be applied to the screenshot 300a.

In this example, the application window 315a operates a drawing application 105a and is in use and in focus. In particular, the application window 315a may represent a drawing application 105a-1 where a user may draw pictures with a specialized stylus. In particular, the user may draw features on the sun shape within the application window 315a. The application window 310a illustrates another drawing application 105a-2 where a user also draws with a stylus. However, as shown in FIG. 5, the application 105a-2 is out of focus of the operating system since the user presently provides input to the application 105a-1 associated with the application window 315a.

In this example, the boundaries generated at block 210 define an area about the stylus that was used to draw a feature within the application window 315a and extends beyond the borders of the application window 315a. Furthermore, it is to be appreciated that if the stylus is used to draw the sun shape shown in FIG. 5, the region need not be centered around the stylus. The rendering engine 20a may render output to the touchscreen device 15a to indicate the boundaries of the region. In this example, the boundaries of the region is shown as the dashed lines 320a rendered on the touchscreen device 15a.

Continuing with this present example, a plurality of events may be received within the region as well as outside of the region. As the method 200 is not applied to outside input (i.e. input received on the touchscreen device outside of the region within the dashed lines 320a), outside input received at the touchscreen device 15 is automatically transmitted to the processor 25a for further processing. Accordingly, this allows a user to provide input on the touchscreen device 15a outside of the region with any means available, such as a stylus, a finger, a palm, or other object. For example, the user may select shortcut icons 305a-1 or 305a-2 with a finger while a stylus is used to draw additional shapes within the window 315a. Similarly, the user may use a finger or stylus to bring the window 310a into focus with a touch in a region within the application window 310a outside of the box defined by the dashed lines 320a that is not overlapped by the application window 315a.

Within box defined by the dashed lines 320a, the plurality of events that are received are classified into different event types. In the present example of a drawing application with a stylus, input from the stylus is transmitted from the touchscreen device 15a to the processor 25a. In particular, a portion of a hand of a user within the box defined by the dashed lines 320a is to be rejected. Accordingly, this feature allows a user to rest portions of a hand, such as a finger or palm, within the box defined by the dashed lines 320a to support fine movements of the stylus without disruptions cause by unintentional input events during the drawing process. Furthermore, in this example, since the box defined by the dashed lines 320a extends beyond the application window 315a, the user is not able to use a finger to select the shortcut icons 305a-3 or 305a-4. In addition, portions of the application window 310a within the box defined by the dashed lines 320a are not selectable with a finger touch. Accordingly, the user would use the stylus to make a selection or redefine the region such that the shortcut icons 305a-3 or 305a-4 are no longer in the box defined by the dashed lines 320a.

Figure 6:
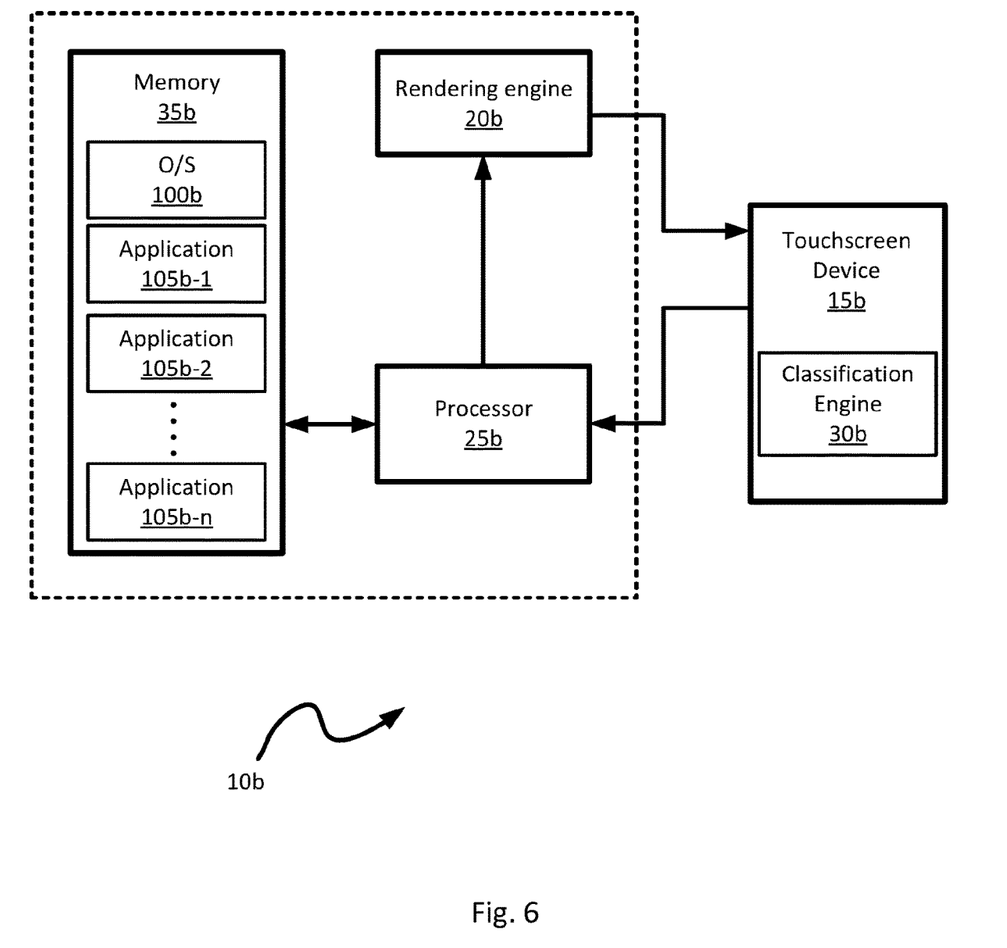
FIG. 6 is a block diagram of another example apparatus.

Referring to FIG. 6, another example of an apparatus to interact with a user is shown at 10b. Like components of the apparatus 10b bear like reference to their counterparts in the apparatus 10a, except followed by the suffix "b". The apparatus 10b includes a touchscreen device 15b, a rendering engine 20b, a processor 25b, and a memory storage unit 35b. Although the present example shows the rendering engine 20b and the processor 25b as separate components, in other examples, the rendering engine 20b and the processor 25b may be part of the same physical component such as a microprocessor capable to carry out multiple functions.

The touchscreen device 15b is to receive input and to transmit the input to the processor 25b. In the present example, the touchscreen device 15b is similar to the touchscreen device 15a. However, a difference is that the touchscreen device 15b includes a classification engine 30b. In this example, the classification engine 30b operates within the touchscreen device 15b instead of operating on the processor 25b which runs the operating system 100b. In particular, the classification engine 30b may be run with a separate processor associated with the touchscreen device 15b. The classification engine 30b may be used to carry out the method 200 to determine a portion of the input data that is to be provided to the processor 25b with software control similar to the classification engine 30a. Alternatively, since the classification engine 30b is located within the touchscreen device 15b, it may activate and deactivate hardware components of the touchscreen device 15b such as certain sensor arrays as discussed above.

In the present example, the processor 25b is similar to the processor 25. In particular, the processor 25b may cooperate with a memory storage unit 35b to execute various instructions. In this example, the processor 25b may maintain and operate various applications 105b with which the user may interact. In other examples, the processor 25b may send or receive data, such as input from and output for the touchscreen device 15b over a network to an external server or remote device.

The memory storage unit 35b is coupled to the processor 25b and may include a non-transitory machine-readable storage medium that may be any electronic, magnetic, optical, or other physical storage device. In the present example, the memory storage unit 35b may store an operating system 100b that is executable by the processor 25b to provide general functionality to the apparatus 10b, for example, functionality to support various applications 105b. Examples of operating systems include Windows™, macOS™, (OS™, Android™, Linux™, and Unix™. The memory storage unit 35b may additionally store instructions to be retrieved by the classification engine 30b at as well as other components and optional peripheral devices of the apparatus 10b.

Furthermore, the memory storage unit 35b may also store executable instructions for a plurality of applications 105b-1, 105b-2, 105b-n (generically, these applications are referred to herein as "application 105b" and collectively they are referred to as "applications 105b", this nomenclature is used elsewhere in this description).

It should be recognized that features and aspects of the various examples provided above may be combined into further examples that also fall within the scope of the present disclosure.

What is claimed is:

1. An apparatus comprising:
    a processor;
    a touchscreen device to:
        receive an event on a surface of the touchscreen device;
        generate boundaries defining a region corresponding to a window of an application of an operating system;
        when the event is outside the boundaries of the region and corresponds to a further window of a further application of the operating system,
            redefine the boundaries defining the region to correspond to the further window of the further application;
        when the event is within the boundaries of the region, classify the event;
        when the event is classified as a first type event, select the event for conversion to input for transmission to the processor; and
        when the event is classifed as a second type event, reject the event for conversion to input for transmission to the processor;
    a rendering engine to render output to the touchscreen device, wherein the region is based on the output rendered to the touchscreen device; and
    wherein the processor is to receive the input transmitted from the touchscreen device and to process the input received from the touchscreen device.

2. The apparatus of claim 1, wherein the region corresponds to a window of an application of an operating system.

3. The apparatus of claim 2, wherein the application is in use and in focus of the operating system.

4. The apparatus of claim 1, wherein the touchscreen device classifies the event into a first type event and a second type event.

5. The apparatus of claim 4, wherein the touchscreen device converts the first type event into input for transmission and rejects the second type event.

6. The apparatus of claim 1, wherein the touchscreen device is to convert the event to the input for transmission when the event is located outside the boundaries of the region.

7. The apparatus of claim 1, wherein the rendering engine is to render a visual aid to facilitate identification of the boundaries.

8. A method comprising:
- generating boundaries at a processor, the boundaries to define a region of a touchscreen device, wherein the boundaries corresponds to a window of an application of an operating system;
- rendering output to the touchscreen device with a rendering engine, wherein the region is based on the output rendered to the touchscreen device;
- when an event is received outside the boundaries of the region and corresponds to a further window of a further application of the operating system, redefining the boundaries defining the region to correspond to the further window of the further application;
- receiving a plurality of events on a surface of the touchscreen device;
- selecting, at the touchscreen device, a first portion of the plurality of events which are received within the boundaries of the region and converting the first portion of the plurality of events to input for transmission to the processor;
- rejecting, at the touchscreen device, a second portion of the plurality of events for conversion to input for transmission to the processor;
- converting, at the touchscreen device, a third portion of the plurality of events which are received outside the boundaries of the region to input for transmission;
- transmitting, by the touchscreen device, the input to the processor; and
- processing, at the processor, the input received from the touchscreen device.

9. The method of claim 8, wherein defining the region comprises determining borders of a window of an application of an operating system.

10. The method of claim 9, further comprising identifying the application as being in use and in focus.

11. The method of claim 8, further comprising classifying each event from the plurality of events into a first type event and a second type event.

12. The method of claim 11, further comprising converting the first type event into input for transmission and rejecting the second type event.

13. A non-transitory machine-readable storage medium encoded with instructions executable by a touchscreen device, the non-transitory machine-readable storage medium comprising:
- instructions to receive boundaries from a processor to define a region of the touchscreen device, wherein the boundaries correspond to a window of an application of an operating system;
- instructions to render output to the touchscreen device, wherein the region is based on the output rendered to the touchscreen device;
- instructions to, when an event is received outside the boundaries of the region and corresponds to a further window of a further application of the operating system, redefine the boundaries defining the region to correspond to the further window of the further application;
- instructions to receive a plurality of events on a surface of the touchscreen device;
- instructions to select, at the touchscreen device, an event from the plurality of events, wherein the event is within the boundaries of the region and wherein a type of the event is used to identify and convert the event from the plurality of events to input for transmission;
- instructions to reject detected events of a different type for conversion to input for transmission when the detected events of the different type are rejected within the region;
- instructions to transmit the input from the touchscreen device to the processor; and
- instructions to process, at the processor, the input received from the touchscreen device.

14. The non-transitory machine-readable storage medium of claim 13, further comprising instructions to render a visual aid to facilitate identification of the boundaries.

* * * * *